(12) United States Patent
Ito et al.

(10) Patent No.: US 9,545,888 B2
(45) Date of Patent: Jan. 17, 2017

(54) VEHICLE COMPOSITE CABLE AND VEHICLE COMPOSITE HARNESS

(71) Applicant: Hitachi Metals, Ltd., Tokyo (JP)

(72) Inventors: Hiroyuki Ito, Kasama (JP); Naoya Toyoshima, Tokai-mura (JP); Yoshikazu Hayakawa, Hitachi (JP); Tomoyuki Murayama, Hitachi (JP); Hirotaka Eshima, Hitachi (JP); Shinya Hayashi, Hitachi (JP); Minoru Oikawa, Hitachinaka (JP); Takahiro Futatsumori, Mito (JP); Hiroshi Sakaguchi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/971,207

(22) Filed: Dec. 16, 2015

(65) Prior Publication Data

US 2016/0176369 A1   Jun. 23, 2016

(30) Foreign Application Priority Data

Dec. 22, 2014  (JP) .................................. 2014-258954

(51) Int. Cl.
*H01B 7/18* (2006.01)
*H01B 7/00* (2006.01)
(Continued)

(52) U.S. Cl.
CPC .......... *B60R 16/023* (2013.01); *B60R 16/0207* (2013.01); *H01B 7/0045* (2013.01);
(Continued)

(58) Field of Classification Search
USPC .................................. 174/11 R, 107, 113 R
See application file for complete search history.

(56) References Cited

U.S. PATENT DOCUMENTS 5,493,071 A *  2/1996  Newmoyer ............ H01B 7/295
                                                174/110 FC
2003/0083797 A1 *  5/2003  Yokoyama ............ B60T 13/741
                                                701/70
(Continued)

FOREIGN PATENT DOCUMENTS

JP  2012124005 A   6/2012
JP  2013-237428    11/2013
JP  2014-135153 A  7/2014

OTHER PUBLICATIONS

Counterpart Japanese Patent Application JP2014-258954, The Japanese Patent Office Issued an Office Action on Jun. 28, 2016 and English Translation.

(Continued)

*Primary Examiner* — Michael F McAllister
(74) *Attorney, Agent, or Firm* — Roberts Mlotkowski Safran Cole & Calderon, P.C.

(57) ABSTRACT

A vehicle composite cable includes a pair of power wires for supplying a current to an electric parking brake unit that generates a braking force after stopping a vehicle, a first signal line including a twisted pair wire transmitting a first electrical signal during when the vehicle is in motion, a second signal line including a twisted pair wire for transmitting a second electrical signal also during when the vehicle is in motion, and a sheath collectively covering the pair of power wires and the first and second signal lines. The first and second signal lines are not covered with a shield conductor, and the first signal line is separated from the second signal line by the pair of power wires.

12 Claims, 10 Drawing Sheets

(51) Int. Cl.
*B60R 16/02* (2006.01)
*B60R 16/023* (2006.01)
*H01B 9/00* (2006.01)

(52) U.S. Cl.
CPC ......... *H01B 7/1865* (2013.01); *H01B 7/1895* (2013.01); *H01B 9/006* (2013.01)

(56) References Cited

U.S. PATENT DOCUMENTS

| | | | |
|---|---|---|---|
| 2005/0077067 A1* | 4/2005 | Chou | H01B 11/04 174/27 |
| 2011/0088926 A1* | 4/2011 | Grogl | H01B 9/003 174/107 |
| 2013/0277087 A1* | 10/2013 | Hayakawa | B60R 16/0215 174/107 |
| 2014/0190741 A1 | 7/2014 | Hayakawa | |
| 2016/0068119 A1 | 3/2016 | Hayakawa | |

OTHER PUBLICATIONS

Japanese Office Action for corresponding Japanese Patent Application No. 2014-258954 dated Oct. 4, 2016 and English translation thereof.

* cited by examiner

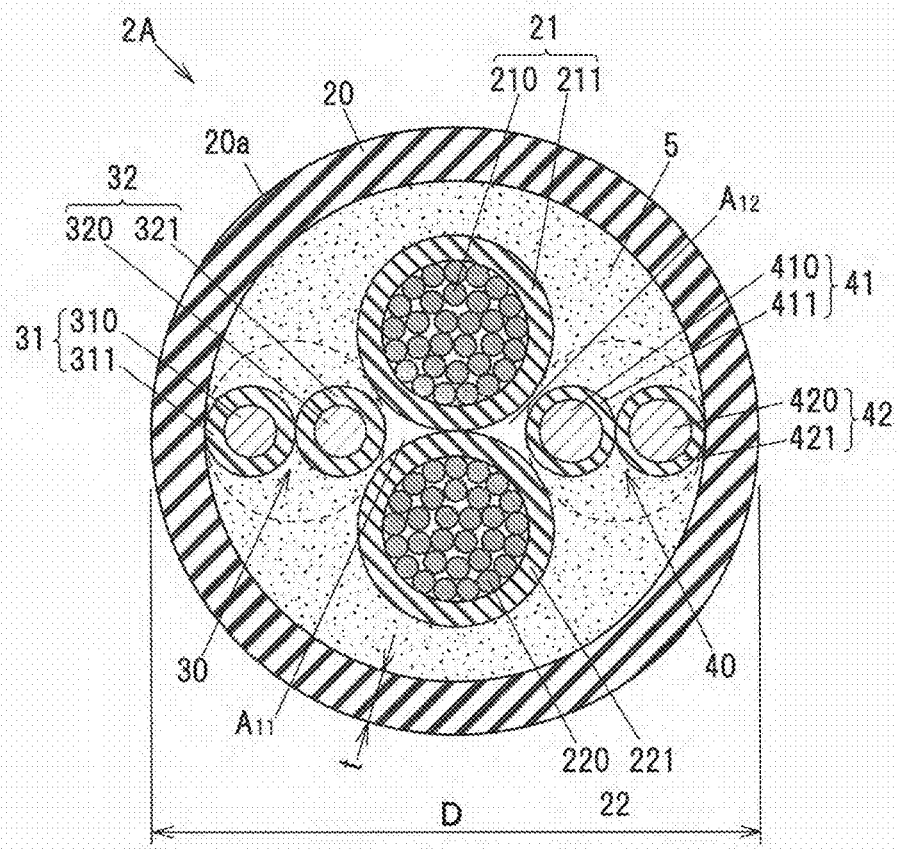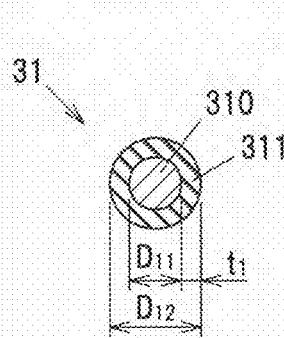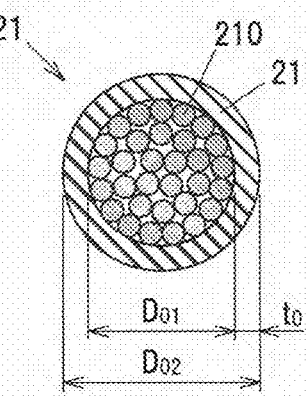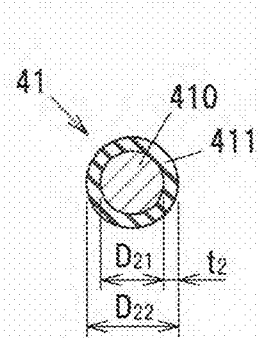
FIG.5A
FIG.5B  FIG.5C  FIG.5D

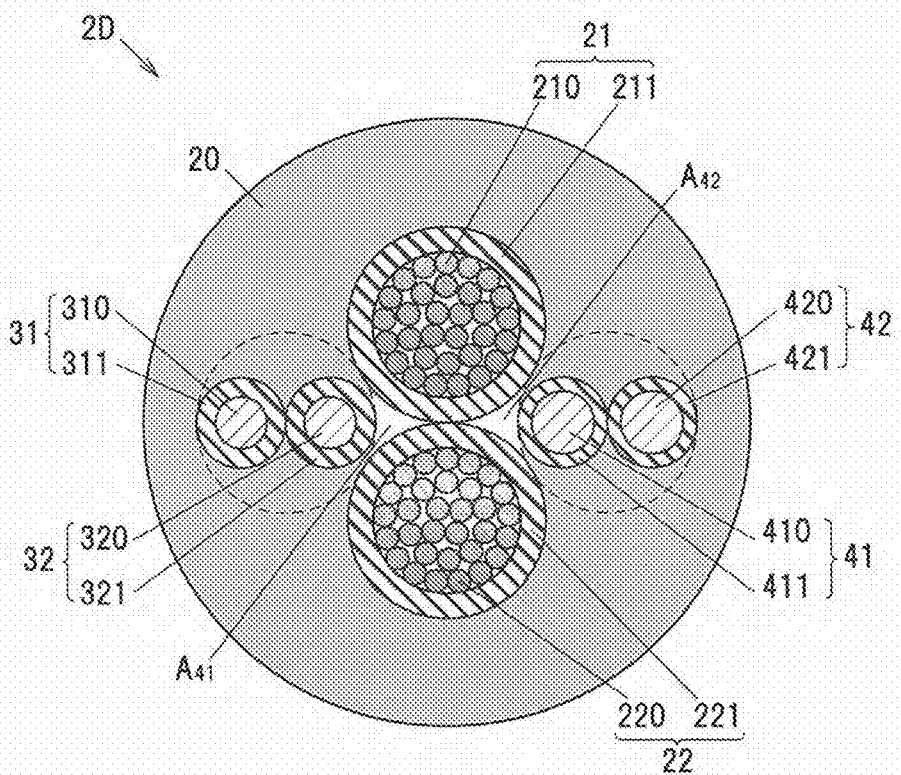

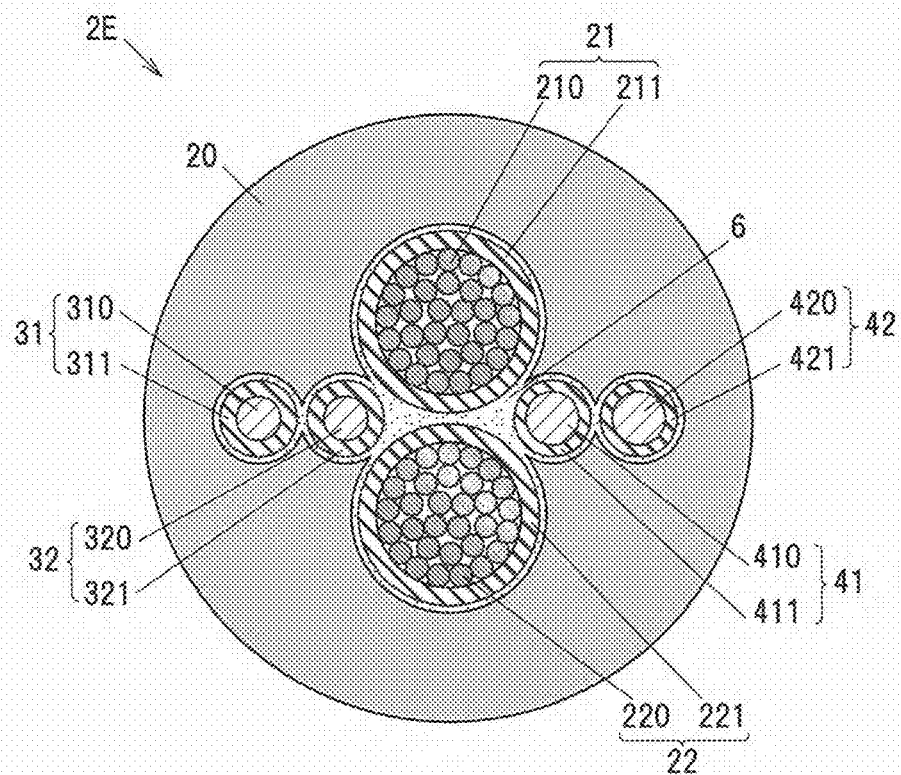

VEHICLE COMPOSITE CABLE AND VEHICLE COMPOSITE HARNESS

The present application is based on Japanese patent application No. 2014-258954 filed on Dec. 22, 2014, the entire contents of which are incorporated herein by reference.

BACKGROUND OF THE INVENTION

1. Field of the Invention

The invention relates to a vehicle composite cable and a vehicle composite harness using the vehicle composite cable.

2. Description of the Related Art

A composite harness with a composite cable is known in which an electric parking brake cable for supplying a current to an electric parking brake mechanism used to prevent a wheel from turning after stopping a vehicle and an ABS sensor cable connected to an ABS sensor for measuring a rotation speed of wheels during motion of a vehicle are integrated by one sheath (see JP-B-5541331).

This type of composite harness is fixed, at one end, to a vehicle body and, at the other end, to a wheel supported by the vehicle body via a suspension. The composite cable is bent when the vehicle body vertically moves relative to a road surface in accordance with the motion of the vehicle and the composite cable is therefore required to have high bendability. In the composite harness disclosed in JP-B-5541331, an anti-noise shield conductor is not provided in the electric parking brake cable and the ABS sensor cable for the purpose of improving bendability and reducing weight.

SUMMARY OF THE INVENTION

Along with the increasing computerization of vehicles in recent years, plural sensors are attached on a wheel side in some cases. Where plural signal lines transmitting detection signals of the plural sensors are collectively covered with one sheath, crosstalk may be caused between the signal lines unless a shield conductor is provided on each of the plural signal line.

It is an object of the invention to provide a vehicle composite cable that prevents a crosstalk between signal lines even when a pair of power wires for supplying a current to an electric parking brake unit and plural signal lines not covered with a shield conductor are collectively covered with one sheath, as well as a vehicle composite harness using the vehicle composite cable.

According to an embodiment of the invention, a vehicle composite cable comprises:

a pair of power wires for supplying a current to an electric parking brake unit that generates a braking force after stopping a vehicle;

a first signal line comprising a twisted pair wire transmitting a first electrical signal during when the vehicle is in motion;

a second signal line comprising a twisted pair wire for transmitting a second electrical signal also during when the vehicle is in motion; and a sheath collectively covering the pair of power wires and the first and second signal lines, wherein the first and second signal lines are not covered with a shield conductor, and the first signal line is separated from the second signal line by the pair of power wires.

According to another embodiment of the invention, a vehicle composite harness comprises:

the vehicle composite cable defined above, and a connector attached to at least one of ends of the pair of power wires and the first and second signal lines that are exposed from the sheath.

Advantageous Effects of the Invention

According to an embodiment of the invention, vehicle composite cable can be provided that prevents a crosstalk between signal lines even when a pair of power wires for supplying a current to an electric parking brake unit and plural signal lines not covered with a shield conductor are collectively covered with one sheath, as well as a vehicle composite harness using the vehicle composite cable.

BRIEF DESCRIPTION OF THE DRAWINGS

Next, the present invention will be explained in more detail in conjunction with appended drawings, wherein:

FIGS. 5A to 5D are cross sectional views showing the composite cable and elements of the composite cable;

FIG. 8 is a cross sectional view showing a composite cable in a fourth embodiment;

FIG. 9 is a cross sectional view showing a composite cable in a fifth embodiment;

DETAILED DESCRIPTION OF THE PREFERRED EMBODIMENTS

First Embodiment

Figure 1:
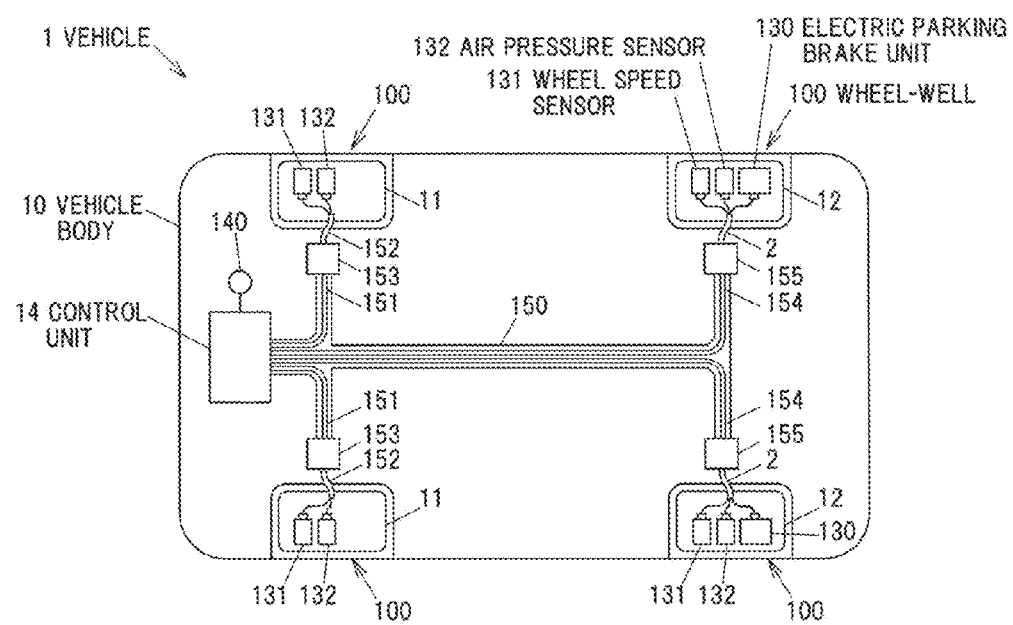
FIG. 1 is an illustration diagram schematically showing a configuration of a vehicle in which a composite harness in a first embodiment is used.

FIG. 1 is an illustration diagram showing a configuration of a vehicle in which a composite harness in the first embodiment is used.

A vehicle 1 has four wheel-wells 100 on a vehicle body 10, and two front wheels 11 and two rear wheels 12 are respectively arranged in the wheel-wells 100. In the first embodiment, the vehicle 1 is a front-wheel-drive vehicle and the front wheels 11 are driven by a drive force from a drive source (not shown) such as an engine or electric motor. In other words, in the first embodiment, the front wheels 11 are drive wheels and the rear wheels 12 are non-driven wheels.

The vehicle 1 also has two electric parking brake units 130 and a control unit 14. The electric parking brake units 130 are provided so as to respectively correspond to the two rear wheels 12, are activated by a current supplied from the control unit 14 and generate a braking force applied to the rear wheels 12. The control unit 14 can detect an operating state of a parking brake activation switch 140 provided inside a passenger compartment of a vehicle and a driver can activate or deactivate the electric parking brake units 130 by an on/off operation of the parking brake activation switch 140.

When a driver turns the parking brake activation switch 140 from, e.g., an off state to an on state during when the vehicle is not in motion, an operating current for operating the electric parking brake units 130 is output from the control unit 14 for a predetermined period of time (e.g., for 1 second). The electric parking brake units 130 are thereby activated and generate a braking force applied to the rear wheels 12. The activated state is maintained until a current to deactivate the electric parking brake units 130 is output from the control unit 14. In this manner, the electric parking brake units 130 generate a braking force mainly after stopping the vehicle 1.

The control unit 14 outputs a current to deactivate the electric parking brake units 130 when the parking brake activation switch 140 is switched from the on state to the off state by an operation of the driver. The control unit 14 outputs a current to deactivate the electric parking brake units 130 also when, e.g., an accelerator pedal is depressed, in addition to when the parking brake activation switch 140 is turned off.

Meanwhile, each of the front wheels 11 and the rear wheels 12 is provided with a wheel speed sensor 131 for detecting a wheel speed and an air pressure sensor 132 for detecting air pressure of a tire. The wheel speed sensor 131 itself is a well-known wheel speed sensor which has a magnetic field sensing element for detecting a magnetic field of an annular magnetic encoder rotating together with the front wheel 11 or the rear wheel 12 and detects a wheel speed (a rotation speed of the front wheel 11 or the rear wheel 12) based on the cycle of change in the direction of the magnetic field. The air pressure sensor 132 has, e.g., a diaphragm of which deflection changes in response to air pressure of the tire, and the air pressure sensor 132 outputs an electrical signal corresponding to the deflection of the diaphragm.

The control unit 14 is electrically connected to the wheel speed sensors 131 and the air pressure sensors 132 of the front wheels 11 through front wheel wire groups 151 composed of plural wires and front wheel wire harnesses 152. In each junction box 153 which is fixed to the vehicle body 10, the front wheel wire group 151 is connected to the front wheel wire harness 152. The junction boxes 153 are respectively arranged in the vicinities of the pair of right and left front wheels 11.

The control unit 14 is also electrically connected to the electric parking brake units 130, the wheel speed sensors 131 and the air pressure sensors 132 of the rear wheels 12 through rear wheel wire groups 154 composed of plural wires and rear wheel wire harnesses 2. The rear wheel wire harness 2 is one embodiment of a "composite harness" of the invention. In each junction box 155 which is fixed to the vehicle body 10, the rear wheel wire group 154 is connected to the rear wheel wire harness 2. The junction boxes 155 are respectively arranged in the vicinities of the pair of right and left rear wheels 12.

The front wheel wire groups 151 are arranged on a wiring path 150 provided on the vehicle body 10 in a bundled state. The rear wheel wire groups 154 are also arranged on the wiring path 150 provided on the vehicle body 10 in a bundled state, in the same manner as the front wheel wire groups 151.

One end of the front wheel wire harness 152 is connected to the wheel speed sensor 131 and the air pressure sensor 132 of the front wheel 11, and the other end is housed in the junction box 153. One end of the rear wheel wire harness 2 is connected to the electric parking brake unit 130, the wheel speed sensor 131 and the air pressure sensor 132 of the rear wheel 12, and the other end is housed in the junction box 155. The front wheel wire harnesses 152 and the rear wheel wire harnesses 2 are bent in accordance with vertical movement of the front wheels 11 and the rear wheels 12 relative to the vehicle body 10 during motion of the vehicle 1, and are thus required to have a high flexibility. Hereinafter, the rear wheel wire harness 2 is simply referred to as "wire harness 2".

Figure 2:
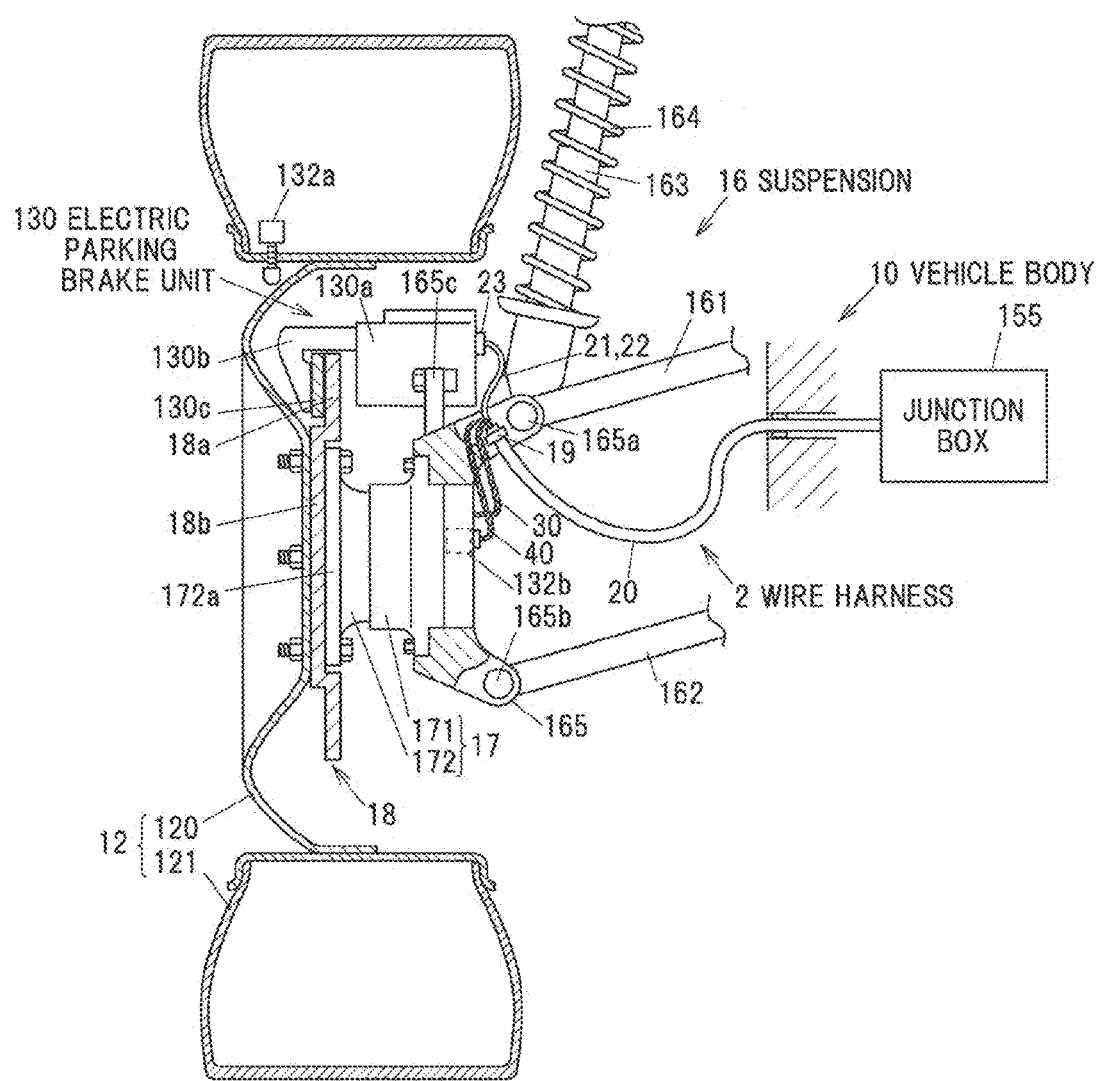
FIG. 2 is an illustration diagram schematically showing a configuration example of the periphery of a rear wheel.

FIG. 2 is an illustration diagram showing a configuration example of the periphery of the rear wheel 12. The rear wheel 12 is supported on the vehicle body 10 by a suspension 16. The suspension 16 is composed of an upper arm 161, a lower arm 162, a shock absorber 163 and a suspension spring 164. Both the upper arm 161 and the lower arm 162 are coupled, at one end, to a knuckle 165 and are coupled, at the other end, to the vehicle body 10. An outer ring 171 of a hub unit 17 of the rear wheel 12 is fixed to the knuckle 165. The upper arm 161, together with the shock absorber 163, is coupled to a first attachment portion 165a of the knuckle 165, and the lower arm 162 is coupled to a second attachment portion 165b of the knuckle 165.

The suspension spring 164 is coaxially arranged around the shock absorber 163 and extends and contracts in response to vertical movement of the vehicle body 10 relative to a road surface. Then, the upper arm 161 and the lower arm 162 swing relative to the vehicle body 10 in accordance with the extension and compression of the shock absorber 163.

The knuckle 165 also has a third attachment portion 165c which is provided in a protruding manner and to which the electric parking brake unit 130 is fixed. The electric parking brake unit 130 has a main body 130a, a caliper 130b and a brake pad 130c fixed to the caliper 130b.

The hub unit 17 has the outer ring 171 and a hub ring 172 supported rotatably with respect to the outer ring 171. A wheel mounting flange 172a is provided on the hub ring 172, and the rear wheel 12 is mounted on the wheel mounting flange 172a. Plural rolling elements (not shown) held by a retainer are arranged in the hub unit 17 between an inner peripheral surface of the outer ring 171 and an outer peripheral surface of the hub ring 172.

A disc-shaped brake rotor 18, together with a wheel rim 120 of the rear wheel 12, is fixed to the wheel mounting flange 172a of the hub ring 172. The brake rotor 18 integrally has a friction portion 18a frictionally engaged with the brake pad 130c of the electric parking brake unit 130 and a fixed portion 18b fixed to the wheel mounting flange 172a of the hub ring 172. The friction portion 18a is arranged so that a side surface thereof faces the brake pad 130c of the electric parking brake unit 130. When the electric parking brake unit 130 is activated, the caliper 130b is retracted into the main body 130a and the brake pad 130c is pressed against the friction portion 18a of the brake rotor 18. A frictional force is thereby generated between the brake pad 130c and the brake rotor 18 and acts as a braking force to brake the vehicle 1.

A tire 121 is mounted on the wheel rim 120. The tire 121 is a rubber tire formed of a rubber material, such as a synthetic rubber or a natural rubber, mixed with a strengthening agent, etc. The air pressure sensor 132 is composed of a sensing element 132a emitting a radio signal corresponding to air pressure of the tire 121, and an antenna element 132b for receiving the radio signal emitted from the sensing element 132a. The sensing element 132a is attached to the wheel rim 120 and rotates together with the rear wheel 12. The antenna element 132b is fixed to a non-rotating member which does not rotate with rotation of the rear wheel 12. The antenna element 132b is fixed to the knuckle 165 as a non-rotating member in the first embodiment, but may be fixed to, e.g., the vehicle body 10.

The radio signal emitted from the sensing element 132a is converted into an electrical signal by the antenna element 132b and is then transmitted to the control unit 14 via the wire harness 2. The control unit 14 provides an alert to a driver by warning light or alarm tone when the air pressure detected by the air pressure sensor 132 is less than a predetermined value.

Configuration of Wire Harness 2

Figure 3:
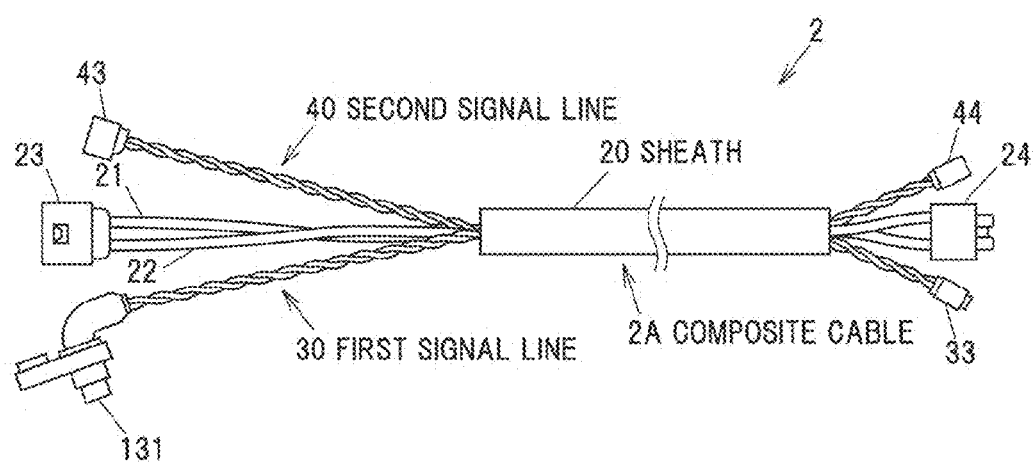
FIG. 3 is an illustration diagram schematically showing a specific example of a configuration of a wire harness.
Figure 4:
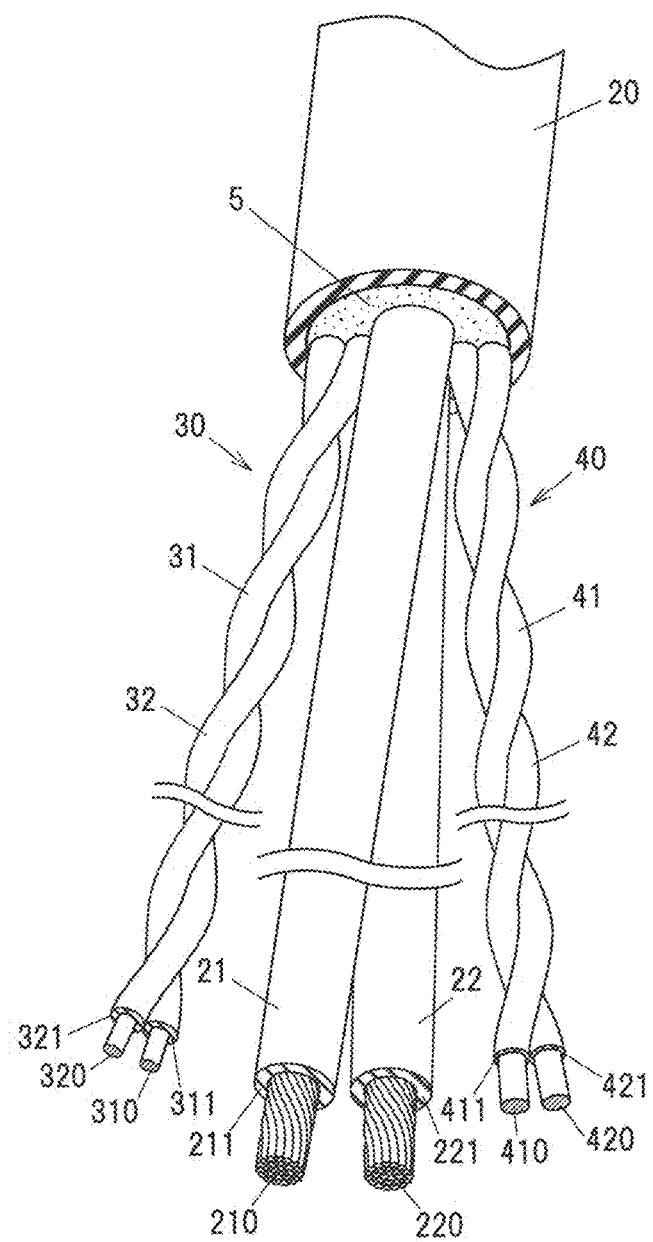
FIG. 4 is an illustration diagram schematically showing an end portion of a composite cable constituting the wire harness.

FIG. 3 is an illustration diagram showing a specific example of a configuration of the wire harness 2. FIG. 4 is an illustration diagram showing an end portion of a composite cable 2A constituting the wire harness 2. FIG. 5A is a cross sectional view showing the composite cable 2A, FIG. 5B is a cross sectional view showing an insulated wire 31 constituting a first signal line 30, FIG. 5C is a cross sectional view showing a power wire 21, and FIG. 5D is a cross sectional view showing an insulated wire 41 constituting a second signal line 40.

In FIG. 3, an end portion on the rear wheel 12 side is shown on the left and an end portion on the junction box 155 is shown on the right. Hereinafter, an end portion of the wire harness 2 on the rear wheel 12 side is referred to as "one end" and an end portion on the junction box 155 side is referred to as "other end".

The composite cable 2A has a pair of power wires 21 and 22, the first signal line 30 formed of a twisted pair wire, the second signal line 40 likewise formed of a twisted pair wire, a sheath 20 covering the pair of power wires 21 and 22 and the first and second signal lines 30 and 40 all together, and a filler 5 housed in the sheath 20.

A first power connector 23 used for connection to the electric parking brake 130 is attached to one end of the pair of power wires 21 and 22, and a second power connector 24 used for connection to the rear wheel wire group 154 in the junction box 155 is attached to the other end of the pair of power wires 21 and 22.

The wheel speed sensor 131 is attached to one end of the first signal line 30, and a first signal line connecting connector 33 used for connection to the rear wheel wire group 154 in the junction box 155 is attached to the other end. Meanwhile, an antenna element connecting connector 43 used for connection to the antenna element 132b of the air pressure sensor 132 is attached to one end of the second signal line 40, and a second signal line connecting connector 44 used for connection to the rear wheel wire group 154 in the junction box 155 is attached to the other end.

The wire harness 2 is composed of the composite cable 2A, the first power connector 23, the second power connector 24, the wheel speed sensor 131, the first signal line connecting connector 33, the antenna element connecting connector 43 and the second signal line connecting connector 44.

The pair of power wires 21 and 22 are used to supply a current to the electric parking brake unit 130. The first signal line 30 is used to transmit a detection signal from the wheel speed sensor 131 to the control unit 14. Meanwhile, the second signal line 40 is used transmit a detection signal from the air pressure sensor 132 to the control unit 14.

That is, vehicle state quantity detection signals indicating the running state of the vehicle 1 are transmitted to the control unit 14 through the first signal line 30 and the second signal line 40. The detection signal transmitted from the wheel speed sensor 131 through the first signal line 30 is a signal for detecting a wheel speed of the rear wheel 12 and is a specific example of "the first electrical signal" of the invention. Meanwhile, the detection signal transmitted from the air pressure sensor 132 through the second signal line 40 is a specific example of "the second electrical signal" of the invention.

The filler 5 is present between the pair of power wires 21 and 22 and the first and second signal lines 30 and 40 inside the sheath 20. Due to the presence of the filler 5, an outer peripheral surface 20a of the sheath 20 has a shape closer to a circle as viewed in a cross section orthogonal to a central axis of the composite cable 2A, and routing properties of the composite cable 2A are improved. In addition, the filler 5 prevents the sheath 20, the pair of power wires 21 and 22, the first signal line 30 and the second signal line 40 from rubbing against each other when the composite cable 2A is bent, thereby increasing bending resistance of the composite cable 2A.

The sheath 20 is formed of an insulating resin. In detail, a soft polyurethane excellent in flexibility and durability is particularly suitable as a material of the sheath 20. As shown in FIG. 5A, D is from 8.0 to 10.0 mm and t is from 1.0 to 2.0 mm, where D is an outer diameter of the sheath 20 and t is a thickness thereof.

The pair of power wires 21 and 22 are insulated wires respectively formed by covering central conductors 210 and 220 comprising highly conductive wires of copper, etc., with insulations 211 and 221 formed of an insulating resin. The insulations 211 and 221 are formed of, e.g., a crosslinked PE (polyethylene) or a crosslinked flame-retardant PE (polyethylene). The outer diameter of the central conductor 210 and the thickness and outer diameter of the insulation 211 of the power wire 21 are respectively the same as the outer diameter of the central conductor 220 and the thickness and outer diameter of the insulation 221 of the other power wire 22. As shown in FIG. 5C, $D_{01}$ is from 1.8 to 2.3 mm, $t_0$ is from 0.3 to 0.5 mm and $D_{02}$ is from 2.9 to 3.1 mm, where $D_{01}$ is the outer diameter of the central conductor 210 of the power wire 21, $t_0$ is the thickness of the insulation 211 and $D_{02}$ is the outer diameter of the insulation 211.

The first signal line 30 is a twisted pair wire formed by twisting a pair of insulated wires 31 and 32 together at a predetermined twist pitch. The insulated wire 31, as one of the pair, is formed by covering a central conductor 310 comprising highly conductive wires of copper, etc., with an insulation 311 formed of an insulating resin. Likewise, the other insulated wire 32 is formed by covering a central conductor 320 comprising highly conductive wires of copper, etc., with an insulation 321 formed of an insulating resin. Each of the central conductors 310 and 320 of the insulated wires 31 and 32 is a twisted wire formed of plural strands. The insulation 311 and 321 are formed of, e.g., a crosslinked PE (polyethylene) or a crosslinked flame-retardant PE (polyethylene).

The outer diameter of the central conductor 310 and the thickness and outer diameter of the insulation 311 of the insulated wire 31 are respectively the same as the outer diameter of the central conductor 320 and the thickness and outer diameter of the insulation 321 of the other insulated wire 32. In other words, the insulated wires 31 and 32 are composed of the same elements of the same dimensions. As shown in FIG. 5B, $D_{11}$ is from 0.6 to 0.9 mm, $D_{12}$ is from 1.3 to 1.6 mm and $t_1$ is from 0.25 to 0.4 mm, where $D_{11}$ is the outer diameter of the central conductor 310 of the insulated wire 31, $t_1$ is the thickness of the insulation 311 and $D_{12}$ is the outer diameter of the insulation 311.

The second signal line 40 is a twisted pair wire formed by twisting a pair of insulated wires 41 and 42 together at a predetermined twist pitch. The second signal line 40 is twisted at the same twist pitch in the same twisting direction as the first signal line 30 and is configured in the same manner as the first signal line 30.

In detail, the insulated wire 41 as one of the pair constituting the second signal line 40 is formed by covering a central conductor 410 comprising highly conductive wires of copper, etc., with an insulation 411 formed of an insulating resin, and the other insulated wire 42 is likewise formed by covering a central conductor 420 comprising highly conductive wires of copper, etc., with an insulation 421 formed of an insulating resin. Each of the central conductors 410 and 420 of the insulated wires 41 and 42 is a twisted wire formed of plural strands, and the insulation 411 and 421 are formed of, e.g., a crosslinked PE (polyethylene) or a crosslinked flame-retardant PE (polyethylene).

In the second signal line 40, the outer diameter of the central conductor 410 and the thickness and outer diameter of the insulation 411 of the insulated wire 41 are respectively the same as the outer diameter of the central conductor 420 and the thickness and outer diameter of the insulation 421 of the other insulated wire 42. In other words, the insulated wires 41 and 42 are composed of the same elements of the same dimensions. As shown in FIG. 5D, $D_{21}$ is from 0.7 to 1.0 mm, $D_{22}$ is from 1.4 to 1.8 mm and $t_2$ is from 0.25 to 0.4 mm, where $D_{21}$ is the outer diameter of the central conductor 410 of the insulated wire 41, $t_2$ is the thickness of the insulation 411 and $D_{22}$ is the outer diameter of the insulation 411.

In the first embodiment, the outer diameter (thickness) $D_{12}$ of the insulated wires 31 and 32 of the first signal line 30 is about the same as the outer diameter (thickness) $D_{22}$ of the insulated wires 41 and 42 of the second signal line 40. In detail, a ratio of $D_{12}$ to $D_{22}$ ($D_{12}/D_{22}$) is not less than 0.8 and not more than 1.2. The more desirable range of the ratio of $D_{12}$ to $D_{22}$ ($D_{12}/D_{22}$) is not less than 0.9 and not more than 1.1.

In FIG. 5A, dashed lines are outlines of areas in which the pair of insulated wires 31 and 32 of the first signal line 30 and the pair of insulated wires 41 and 42 of the second signal line 40 are present when viewing the cross section of the drawing in a longitudinal direction of the composite cable 2A.

One end of the sheath 20 of the composite cable 2A is fixed to a non-rotating member which does not rotate with the rotation of the rear wheel 12. In the first embodiment, the end of the sheath 20 is fixed to the knuckle 165 by a fastener 19, as shown in FIG. 2. However, it is not limited thereto. The end of the sheath 20 may be fixed to a non-rotating member which does not rotate with the rotation of the rear wheel 12 but moves vertically, together with the rear wheel 12, relative to the vehicle body 10 in accordance with the extension and compression of the suspension spring 164.

The first signal line 30 is not covered with a shield conductor. The second signal line 40 is also not covered with a shield conductor. Furthermore, the pair of power wires 21 and 22 are also not covered with a shield conductor. In other words, between the pair of insulated wires 31 and 32 of the first signal line 30 and the pair of power wires 21 and 22 and between the pair of insulated wires 41 and 42 of the second signal line 40 and the pair of power wires 21 and 22, only the filler 5 is present and any conductive members for shielding electromagnetic wave are not arranged.

This is because it is not necessary to provide a shield conductor between the first signal line 30 and the pair of power wires 21 and 22 and between the second signal line 40 and the pair of power wires 21 and 22 since a current flows through the pair of power wires 21 and 22 mainly during when the vehicle 1 is not in motion and electrical signals are transmitted through the first and second signal lines 30 and 40 mainly during when the vehicle 1 is in motion.

That is, when a current flows through the pair of power wires 21 and 22, electromagnetic wave generated by the current can affect a potential difference between the pair of insulated wires 31 and 32 in the first signal line 30 and a potential difference between the pair of insulated wires 41 and 42 in the second signal line 40. However, since the control unit 14 can be set to ignore the electrical signals transmitted through the first and second signal lines 30 and 40 during when the vehicle 1 is not in motion, i.e., when a vehicle speed is zero, an adverse effect on travel of the vehicle 1 can be avoided. In addition, not covering the first and second signal lines 30 and 40 with a shield conductor increases flexibility and resulting bendability of the composite cable 2A and also contributes to weight reduction and cost reduction of the composite cable 2A.

Furthermore, in the first embodiment, the first signal line 30 is separated from the second signal line 40 by the pair of power wires 21 and 22. In other words, a space inside the sheath 20 is divided by the pair of power wires 21 and 22 into a housing space for the first signal line 30 and a housing space for the second signal line 40.

This is because, in view of the fact that crosstalk is likely to occur between the first signal line 30 and the second signal line 40 when the first and second signal lines 30 and 40 are not covered with a shield conductor as described above, the composite cable 2A is configured that the pair of power wires 21 and 22 are sandwiched between the first signal line 30 and the second signal line 40 to suppress crosstalk. In other words, since the pair of power wires 21 and 22 are interposed between the first signal line 30 and the second signal line 40, a distance between the first signal line 30 and the second signal line 40 is always more than a distance at which crosstalk occurs, and crosstalk between the first signal line 30 and the second signal line 40 is thereby suppressed.

In detail, a distance between the pair of power wires 21 and 22 is smaller than the thickness of the insulated wires 31 and 32 of the first signal line 30 and the thickness of the insulated wires 41 and 42 of the second signal line 40, so that the pair of insulated wires 31 and 32 of the first signal line 30 are not directly in contact with the pair of insulated wires 41 and 42 of the second signal line 40. In the example shown in FIG. 5A, the pair of power wires 21 and 22 are in contact with each other and the distance therebetween is zero. In addition, the central conductors 210 and 220 of the power wires 21 and 22, which are electrically conductive bodies, are expected to have a certain shielding effect and crosstalk is suppressed also by the shielding effect of the central conductors 210 and 220.

In the first embodiment, since the outer diameter $D_{12}$ of the insulated wires 31 and 32 of the first signal line 30 is about the same as the outer diameter $D_{22}$ of the insulated wires 41 and 42 of the second signal line 40 as described above, the pair of power wires 21 and 22 are located at the center of the sheath 20 in an alignment direction of the first signal line 30 and the second signal line 40 as viewed in the cross section of the composite cable 2A, and a relative position of the pair of power wires 21 and 22 with respect to the first and second signal lines 30 and 40 is stable. As a result, the effect described above is exerted more remarkably.

In addition, in the first embodiment, regions $A_{11}$ and $A_{12}$ surrounded by the pair of power wires 21 and 22 and the first and second signal lines 30 and 40 are voids not filled with the filler 5, as shown in FIG. 5A. This facilitates termination of the composite cable 2A.

That is, for terminating the composite cable 2A, it is necessary to expose the pair of power wires 21 and 22, the first and second signal lines 30 and 40 and the filler 5 by cutting and stripping a portion of the sheath 20 and then to further cut off a portion of the filler 5 exposed from the end of the sheath 20. At this point, if the filler 5 is filled in the regions $A_{11}$ and $A_{12}$, it is difficult to remove the filler 5 since the pair of power wires 21 and 22 and the first and second signal lines 30 and 40 obstruct. Therefore, in the first embodiment, termination of the composite cable 2A is facilitated by not filling the filler 5 in the regions $A_{11}$ and $A_{12}$ surrounded by the pair of power wires 21 and 22 and the first and second signal lines 30 and 40.

As the filler 5, it is possible to use various fibrous materials such as polypropylene yarn, aramid fiber, nylon fiber or fiber plastic, paper and cotton yarn, etc., which are generally used as cable fillers. In the first embodiment, the filler 5 contains an artificial polypeptide fiber. The artificial polypeptide fiber, which is also called artificial spider silk fiber, is an artificial fiber consisting mainly of polypeptide derived from natural spider silk protein and has, e.g., a stress of 350 to 628.7 MPa and a toughness of 138 to 265.4 MJ/m$^3$. It is possible to increase strength of the composite cable 2A by adding the artificial polypeptide fiber to the filler 5.

The artificial polypeptide fiber described above also may be added to the sheath 20. Since addition of the artificial polypeptide fiber increases strength, it is possible to reduce the thickness of the sheath 20, which allows the composite cable 2A to have higher bendability while maintaining strength and also to be lighter in weight.

In the first embodiment, since the first signal line 30 and the second signal line 40 are not covered with a shield conductor, it is possible to increases bendability of the composite cable 2A and also to contribute to weight reduction and cost reduction of the composite cable 2A. In addition, since the first signal line 30 is separated from the second signal line 40 by the pair of power wires 21 and 22, crosstalk between the first signal line 30 and the second signal line 40 is suppressed. In other words, in the first embodiment, it is possible to suppress crosstalk between the first signal line 30 and the second signal line 40 without providing a shield conductor for covering the first signal line 30 and the second signal line 40.

Other Embodiments

Composite cables 2B to 2F in second to sixth embodiments of the invention will be described below. The composite cables 2B to 2F with connectors, etc., attached to ends of the pair of power wires 21 and 22, the first signal line 30 and the second signal line 40 are configured as wire harnesses and are applicable to the vehicle 1 in the same manner as the composite cable 2A in the first embodiment. In addition, the materials and dimensions of the pair of power wires 21 and 22 and the insulated wires 31, 32, 41 and 42 of the first and second signal lines 30 and 40 of the composite cables 2B to 2F can be the same as those described in the first embodiment.

Second Embodiment

The second embodiment of the invention will be described in reference to FIGS. 6A and 6B. The composite cable 2B in the second embodiment is provided with the sheath 20, the pair of power wires 21 and 22, the first signal line 30, the second signal line 40 and the filler 5 and is configured that the first signal line 30 is separated from the second signal line 40 by the pair of power wires 21 and 22 in the same manner as the composite cable 2A in the first embodiment, but a twist phase of the first signal line 30 is different from that of the second signal line 40. This difference will be mainly described below.

Figure 6A:
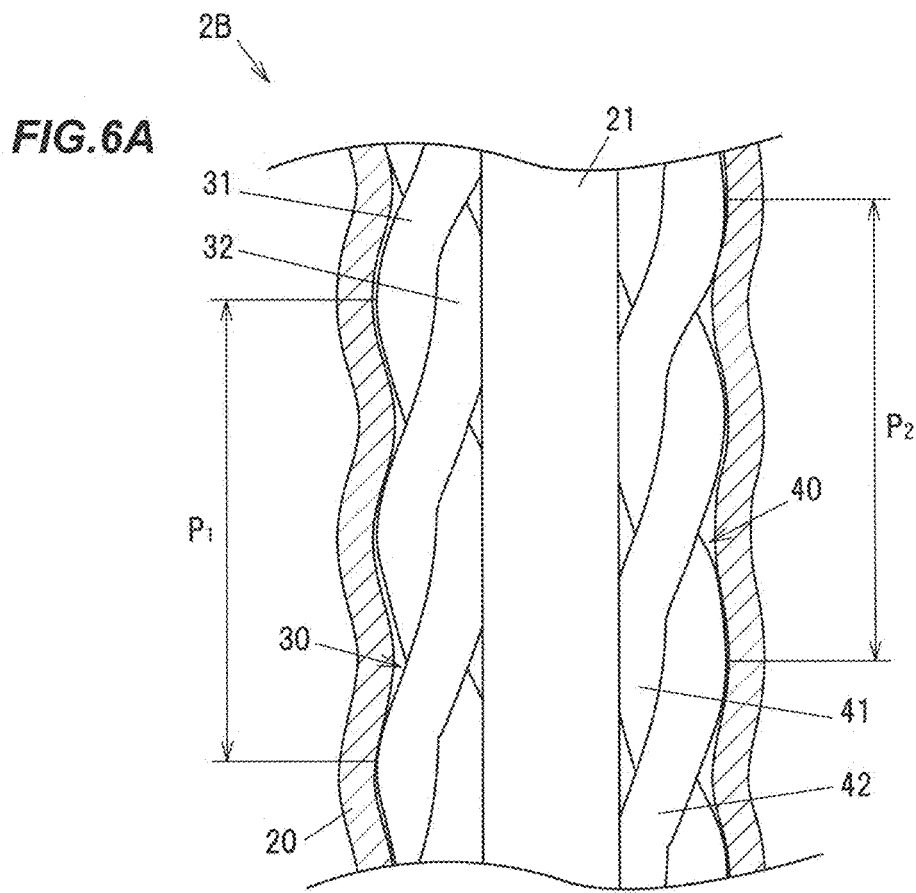
FIG. 6A is an illustration diagram showing an internal configuration of a composite cable in a second embodiment.
Figure 6B:
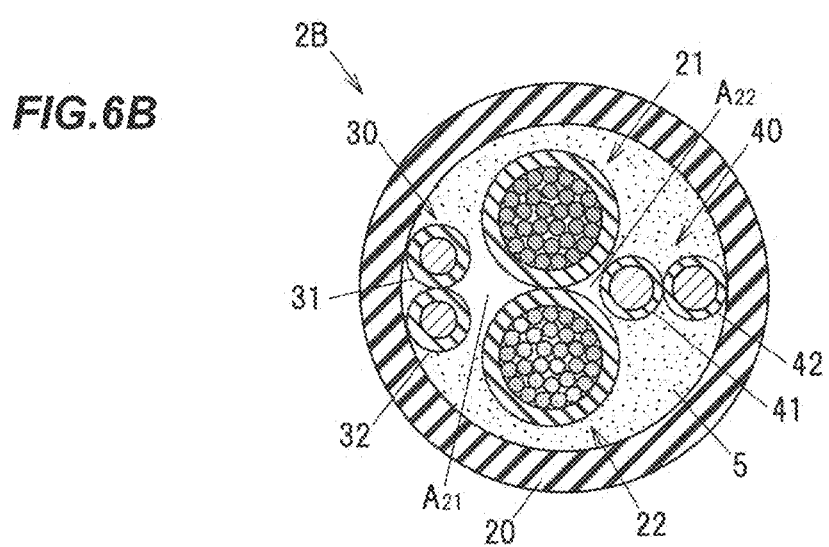
FIG. 6B is a cross sectional view showing the composite cable in FIG. 6A.

FIG. 6A is an illustration diagram showing an internal configuration of the composite cable 2B in the second embodiment and FIG. 6B is a cross sectional view showing the composite cable 2B. In FIG. 6A, an internal configuration of the composite cable 2B is shown by cutting the sheath 20 along a longitudinal direction so that each half has a semicircular cross section, and the illustration of the filler 5 is omitted.

The composite cable 2B in the second embodiment has the first signal line 30 formed by twisting the pair of insulated wires 31 and 32 and the second signal line 40 formed by twisting the pair of insulated wires 41 and 42 in the same manner as the composite cable 2A of the first embodiment. Also, a twist pitch $P_1$ of the pair of insulated wires 31 and 32 of the first signal line 30 is the same as a twist pitch $P_2$ of the pair of insulated wires 41 and 42 of the second signal line 40.

However, a twist phase of the pair of insulated wires 31 and 32 of the first signal line 30 is different from that of the pair of insulated wires 41 and 42 of the second signal line 40, such that the pair of insulated wires 41 and 42 of the second signal line 40 are aligned along a direction orthogonal to an alignment direction of the pair of power wires 21 and 22 when the pair of insulated wires 31 and 32 of the first signal line 30 are aligned along a direction parallel to the alignment direction of the pair of power wires 21 and 22, as viewed in the cross section of FIG. 6B which is orthogonal to a longitudinal direction of the sheath 20.

This configuration allows the sheath 20 to have a smaller diameter. In other words, the composite cable 2B in the second embodiment can have a smaller diameter than the composite cable 2A in the first embodiment.

That is, in the composite cable 2A of the first embodiment, the sheath 20 needs to have an inner diameter which does not allow a distance between the pair of power wires 21 and 22 to be increased by a pressing force from the first signal line 30 and the second signal line 40 even at positions where both the pair of insulated wires 31 and 32 of the first signal line 30 and the pair of insulated wires 41 and 42 of the second signal line 40 are aligned in a direction orthogonal to the alignment direction of the pair of power wires 21 and 22 as shown in FIG. 5A. On the other hand, in the second embodiment, since the pair of insulated wires 31 and 32 of the first signal line 30 and the pair of insulated wires 41 and 42 of the second signal line 40 are not aligned in a row at any positions, it is possible to reduce the inner diameter of the sheath 20 as compared to the composite cable 2A in the first embodiment.

Also in the composite cable 2B of the second embodiment, regions $A_{11}$ and $A_{22}$ surrounded by the pair of power wires 21 and 22 and the first and second signal lines 30 and 40 are voids not filled with the filler 5 to facilitate termination of the composite cable 2B, in the same manner as the composite cable 2A in the first embodiment.

As described above, in the second embodiment, it is possible to reduce a diameter of the composite cable 2B, leading to improvement in the routing properties of the composite cable 2B, in addition to the functions and effects described in the first embodiment.

Third Embodiment

Next, the third embodiment of the invention will be described in reference to FIGS. 7A and 7B. The composite cable 2C in the third embodiment is provided with the sheath 20, the pair of power wires 21 and 22, the first signal line 30, the second signal line 40 and the filler 5 and is configured that the first signal line 30 is separated from the second signal line 40 by the pair of power wires 21 and 22 in the same manner as the composite cable 2A in the first embodiment, but a twist pitch of the first signal line 30 is different from that of the second signal line 40. This difference will be mainly described below.

Figure 7A:
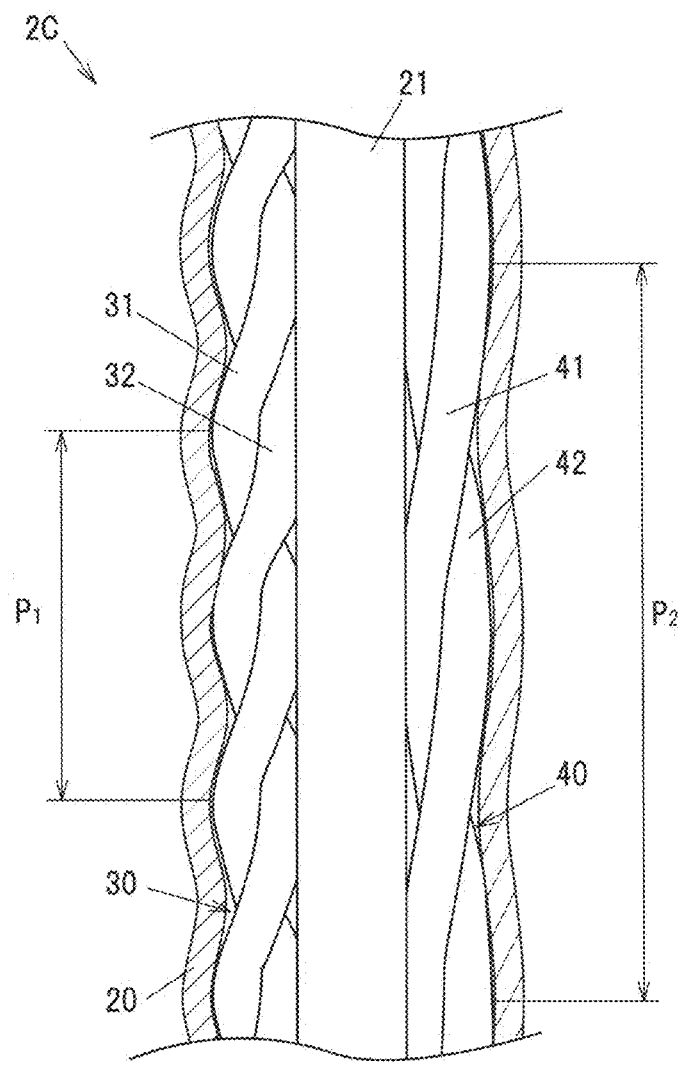
FIG. 7A is an illustration diagram showing an internal configuration of a composite cable in a third embodiment.
Figure 7B:
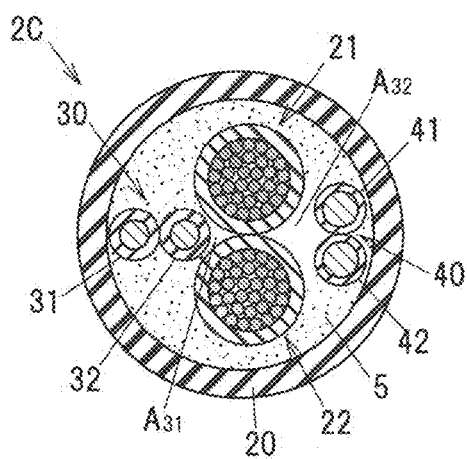
FIG. 7B is a cross sectional view showing the composite cable in FIG. 7A.

FIG. 7A is an illustration diagram showing an internal configuration of the composite cable 2C in the third embodiment and FIG. 7B is a cross sectional view showing the composite cable 2C. In FIG. 7A, an internal configuration of the composite cable 2C is shown by cutting the sheath 20 along a longitudinal direction so that each half has a semicircular cross section, and the illustration of the filler 5 is omitted.

The composite cable 2C in the third embodiment has the first signal line 30 formed by twisting the pair of insulated wires 31 and 32 and the second signal line 40 formed by twisting the pair of insulated wires 41 and 42 in the same manner as the composite cable 2A of the first embodiment, but the twist pitch $P_1$ of the pair of insulated wires 31 and 32 of the first signal line 30 is different from the twist pitch $P_2$ of the pair of insulated wires 41 and 42 of the second signal line 40.

In addition, in the third embodiment, the twist pitch $P_2$ of the second signal line 40 is larger than the twist pitch $P_1$ of the first signal line 30 and is not less than double the twist pitch $P_1$. Alternatively, the twist pitch $P_1$ of the first signal line 30 may be larger than the twist pitch $P_2$ of the second signal line 40 in an opposite manner and, moreover, may be not less than double the twist pitch $P_2$ of the second signal line 40.

As a result, curls or kinks on the composite cable 2C in the third embodiment can be reduced as compared to the composite cable 2A in the first embodiment. Generally, when plural twisted pair wires are housed in one sheath, curls or kinks corresponding to a winding direction of the twisted pair wires may cause the entire cable to twist and turn, resulting in a decrease in routing properties. Meanwhile, in the third embodiment, since the twist pitch $P_1$ of the pair of insulated wires 31 and 32 of the first signal line 30 is different from the twist pitch $P_2$ of the pair of insulated wires 41 and 42 of the second signal line 40, curls or kinks are less likely to occur on the composite cable 2C as compared to, e.g., a cable in which the twist pitch $P_2$ of the second signal line 40 is equal to the twist pitch $P_1$ of the first signal line 30. This effect is more remarkable when one of the twist pitch $P_1$ of the first signal line 30 and the twist pitch $P_2$ of the second signal line 40 is not less than double the other.

In addition, when the twist pitch $P_1$ of the first signal line 30 and the twist pitch $P_2$ of the second signal line 40 are different, it is desirable that signal lines transmitting electrical signals with a longer variation period be twisted at a larger twist pitch. Generally, twisted pair wires with a larger twist pitch are more likely to be affected by electromagnetic noise. However, if the variation period of the signal is long, for example, averaging plural detection results from plural sampling periods or ignoring a detection result significantly different from the others as an outlier allows the twisted pair wires to be less likely to be affected by electromagnetic noise even when the twist pitch is increased.

Based on this, in the composite cable 2C of the third embodiment, the twist pitch $P_2$ of the second signal line 40 transmitting a detection signal from the air pressure sensor 132 is larger than the twist pitch $P_1$ of the first signal line 30 transmitting a signal for detecting a wheel speed.

Also in the composite cable 2C of the third embodiment, regions $A_{31}$ and $A_{32}$ surrounded by the pair of power wires 21 and 22 and the first and second signal lines 30 and 40 are voids not filled with the filler 5 to facilitate termination of the composite cable 2C, in the same manner as the composite cable 2A in the first embodiment.

As described above, in the third embodiment, it is possible to reduce curls or kinks on the composite cable 2C, in addition to the functions and effects described in the first embodiment.

Fourth Embodiment

Next, the fourth embodiment of the invention will be described in reference to FIG. 8. FIG. 8 is a cross sectional view showing the composite cable 2D in the fourth embodiment.

The composite cable 2D in the fourth embodiment is provided with the sheath 20, the pair of power wires 21 and 22, the first signal line 30 and the second signal line 40 and is configured that the first signal line 30 is separated from the second signal line 40 by the pair of power wires 21 and 22 in the same manner as the composite cable 2A in the first embodiment, but the filler 5 is not provided and the pair of power wires 21 and 22, the first signal line 30 and the second signal line 40 are thus held by the sheath 20.

Also in the composite cable 2D of the fourth embodiment, regions $A_{41}$ and $A_{42}$ surrounded by the pair of power wires 21 and 22 and the first and second signal lines 30 and 40 are voids which can be compressed by external pressure. Termination of the composite cable 2D is thereby facilitated, in the same manner as the first embodiment.

The same functions and effects as those described in the first embodiment are also obtained in the fourth embodiment. In addition, the manufacturing process is simplified since the filler 5 is not arranged inside the sheath 20.

As an alternative, the artificial polypeptide fiber described previously may be added to the sheath 20 of the composite cable 2D. Use of the sheath 20 containing the artificial polypeptide fiber increases strength of the sheath 20 per se and thus allows the outer diameter of the sheath 20 to be reduced, and it is thereby possible to reduce the diameter and weight of the composite cable 2D.

Fifth Embodiment

Next, the fifth embodiment of the invention will be described in reference to FIG. 9. FIG. 9 is a cross sectional view showing the composite cable 2E in the fifth embodiment.

The composite cable 2E in the fifth embodiment is different from the composite cable 2D in the fourth embodiment in that a lubricant 6 for reducing frictional resistance and thereby improving lubricity is arranged between the sheath 20 and the pair of power wires 21 and 22/the first and second signal lines 30 and 40. In other words, the composite cable 2E in the fifth embodiment is configured that the pair of power wires 21 and 22 and the first and second signal lines 30 and 40 are held by the sheath 20 via the lubricant 6.

The lubricant 6 can be preferably formed of talc ($Mg_3Si_4O_{10}(OH)_2$) or silica ($SiO_2$), etc., having a particle size of, e.g., 5 to 50 μm. The particle size here means a particle diameter obtained by a method defined by JIS 8801 such as sieve analysis, microscopy, a laser diffraction scattering method, an electrical sensing method or a chromatography method. Alternatively, a paper tape or lubricant oil may be used as the lubricant 6.

In the composite cable 2E in the fifth embodiment, the lubricant 6 allows the pair of power wires 21 and 22 and the first and second signal lines 30 and 40 to move more smoothly inside the sheath 20 than those in the composite cable 2D in the fourth embodiment and this increases bendability.

Sixth Embodiment

Figure 10A:
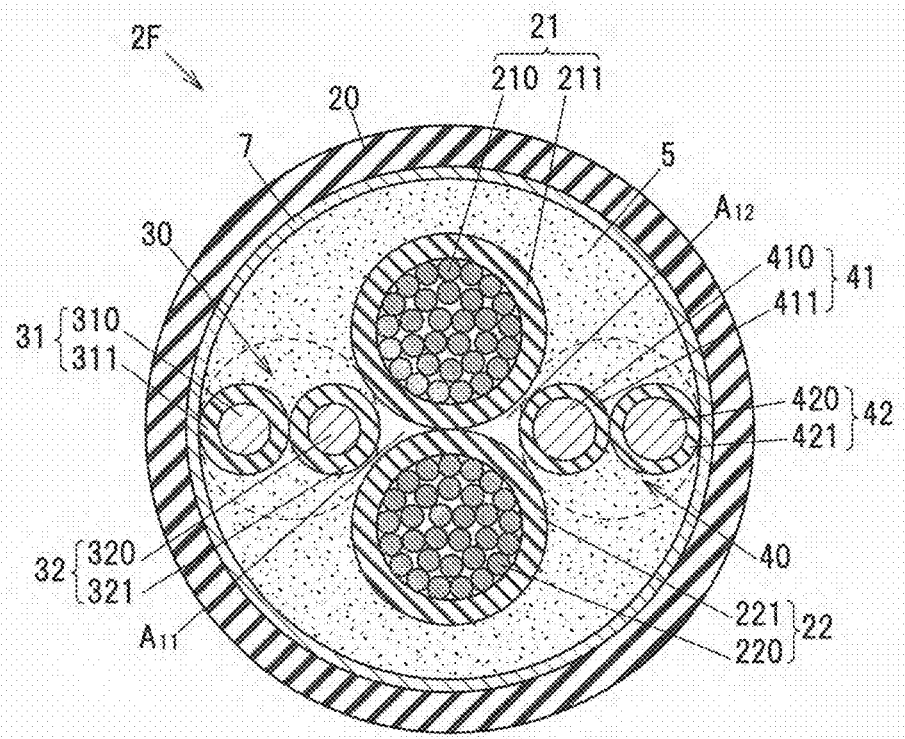
FIG. 10A is a cross sectional view showing a composite cable in a sixth embodiment.
Figure 10B:
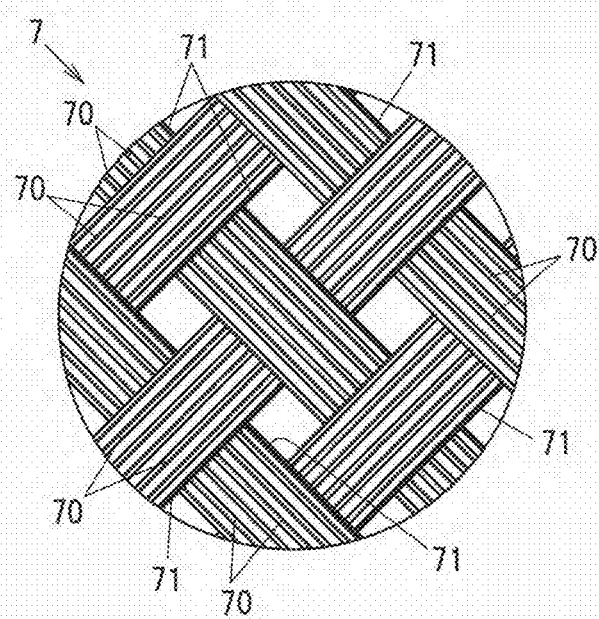
FIG. 10B is an illustration diagram showing a configuration example of a braided shield of the composite cable in FIG. 10A.

Next, the sixth embodiment of the invention will be described in reference to FIGS. 10A and 10B. FIG. 10A is a cross sectional view showing the composite cable 2F in the sixth embodiment, and FIG. 10B is an illustration diagram showing a configuration example of a braided shield 7 of the composite cable 2F.

The composite cable 2F in the sixth embodiment is formed by adding the braided shield 7 to the composite cable 2A in the first embodiment. In other words, the composite cable 2F in the sixth embodiment has the sheath 20, the pair of power wires 21 and 22, the first signal line 30, the second signal line 40 and the filler 5, and is further provided with the braided shield 7 which is arranged inside the sheath 20 so as to collectively cover the pair of power wires 21 and 22 and the first and second signal lines 30 and 40.

To form the braided shield 7, plural highly conductive strands 70 of copper, etc., are braided with an artificial polypeptide fiber 71 in a lattice pattern. In more detail, the braided shield 7 is an artificial spider silk fiber-mixed braided shield in which the plural highly conductive strands 70 of copper, etc. and the artificial polypeptide fiber 71 (artificial spider silk fiber) are braided in a lattice pattern at a predetermined ratio. The "predetermined ratio" here means a ratio at which the originally intended shielding function is not impaired. The same artificial polypeptide fiber described in the first embodiment can be used as the artificial polypeptide fiber 71.

As a possible modification, the braided shield 7 may be a laminated braided shield in which a braided shield layer formed by braiding the plural highly conductive strands 70 of copper, etc. in a lattice pattern and an artificial spider silk braided layer formed by braiding the artificial polypeptide fiber 71 (artificial spider silk fiber) in a lattice pattern are laminated.

Use of the artificial polypeptide fiber 71 (artificial spider silk fiber) as described above allows weight of the braided shield to be reduced.

In this regard, the artificial spider silk braid (artificial spider silk braided layer) described above is applicable not only to cables but also to hoses such as brake hose and is used in a wide range of fields.

In the sixth embodiment, an adverse effect of electromagnetic wave from outside of the braided shield 7 on electrical signal transmission through the first and second signal lines 30 and 40 can be suppressed, in addition to the functions and effects described in the first embodiment. In addition, it is also possible to suppress an adverse effect of electromagnetic wave generated by a current flowing through the pair of power wires 21 and 22 on communication through other cables. Furthermore, since the plural highly conductive strands 70 of copper, etc., are braided with the artificial polypeptide fiber 71 in a lattice pattern to form the braided shield 7, strength of the braided shield 7 is increased and the strands 70 formed of a metal such as copper can be prevented from breaking even when the composite cable 2F is repeatedly bent. This allows thin strands 70 to be used and it is thus possible to increase bendability of the composite cable 2F.

SUMMARY OF THE EMBODIMENTS

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A vehicle composite cable (2A to 2F), comprising: a pair of power wires (21, 22) for supplying a current to an electric parking brake unit (130) that generates a braking force after stopping a vehicle (1); a first signal line (30) comprising a twisted pair wire transmitting a first electrical signal during when the vehicle (1) is in motion; a second signal line (40) comprising a twisted pair wire transmitting a second electrical signal also during when the vehicle (1) is in motion; and a sheath (20) collectively covering the pair of power wires (21, 22) and the first and second signal lines (30, 40), wherein the first and second signal lines (30, 40) are not covered with a shield conductor, and the first signal line (30) is separated from the second signal line (40) by the pair of power wires (21, 22).

[2] The vehicle composite cable (2A to 2F) defined by [1], wherein the first electrical signal comprises a wheel speed detection signal for detecting a rotation speed of a wheel (rear wheel 12), and the second electrical signal comprises a vehicle state quantity detection signal indicating a running state of the vehicle (1) different from the rotation speed of the wheel (12).

[3] The vehicle composite cable (2A to 2F) defined by [1] or [2], wherein regions ($A_{11}$ and $A_{12}$, $A_{21}$ and $A_{22}$, $A_{31}$ and $A_{32}$, $A_{41}$ and $A_{42}$) surrounded by the pair of power wires (21, 22) and the first and second signal lines (30, 40) form a space.

[4] The vehicle composite cable (2A to 2F) defined by any one of [1] to [3], wherein an outer diameter ($D_{12}$) of insulated wires (31, 32) paired and constituting the first signal line (30) is about the same as an outer diameter ($D_{22}$) of insulated wires (41, 42) paired and constituting the second signal line (40).

[5] The vehicle composite cable (2A to 2F) defined by any one of [1] to [4], wherein the first and second signal lines (30, 40) are respectively formed by twisting the pairs of insulated wires (31, 32, 41, 42) at the same twist pitch ($P_1$, $P_2$) and different twist phases, and wherein the pair of insulated wires (41, 42) constituting the second signal line (40) are arranged along a direction orthogonal to an alignment direction of the pair of power wires (21, 22) when the pair of insulated wires (31, 32) constituting the first signal line (30) are arranged along a direction parallel to the alignment direction of the pair of power wires (21, 22), as viewed in a cross section orthogonal to a longitudinal direction of the sheath (20).

[6] The vehicle composite cable (2A to 2F) defined by any one of [1] to [4], wherein the first and second signal lines (30, 40) are respectively formed by twisting the pairs of insulated wires (31, 32, 41, 42) at different twist pitches ($P_1$, $P_2$).

[7] The vehicle composite cable (2A to 2F) defined by [6], wherein one of the twist pitch ($P_1$) of the first signal line (30) and the twist pitch ($P_2$) of the second signal line (40) is not less than double the other.

[8] The vehicle composite cable (2A to 2F) defined by any one of [1] to [7], wherein the sheath (20) includes an artificial polypeptide fiber.

[9] The vehicle composite cable (2A to 2F) defined by any one of [1] to [8], further comprising a filler (5) inside the sheath (20) and among the pair of power wires (21, 22) and the first and second signal lines (30, 40), wherein the filler (5) includes an artificial polypeptide fiber.

[10] The vehicle composite cable (2A to 2F) defined by any one of [1] to [9], further comprising a braided shield (7) inside the sheath (20) so as to collectively cover the pair of power wires (21, 22) and the first and second signal lines (30, 40), wherein strands (70) constituting the braided shield (7) are braided with an artificial polypeptide fiber (71).

[11] The vehicle composite cable (2A to 2F) defined by any one of [1] to [8], wherein the pair of power wires (21, 22) and the first and second signal lines (30, 40) are held by the sheath (20) via a lubricant (6) comprising powder.

[12] A vehicle composite harness (2), comprising: the vehicle composite cable (2A to 2F) defined by any one of [1] to [11], and a connector attached to at least one of ends of the pair of power wires (21, 22) and the first and second signal lines (30, 40) that are exposed from the sheath (20).

Although the embodiments of the invention have been described, the invention according to claims is not to be limited to the embodiments. Further, it should be noted that all combinations of the features described in the embodiments are not necessary to solve the problem of the invention.

In addition, appropriate modifications of the invention can be implemented without departing from the gist of the invention. For example, although the second signal line 40 transmits a detection signal from the air pressure sensor 132 in the embodiments, it is not limited thereto. In other words, the second signal line 40 can transmit any vehicle state quantity detection signal indicating a running state of the vehicle 1 different from the rotation speed of the wheel. The state quantity of the vehicle may be, e.g., a current supplied to an electric motor when driving the rear wheel 12 by an electric motor (in-wheel motor), or may be a steering angle of the rear wheel 12 when steered at a given angle.

In addition, when the electric parking brake unit 130 is provided also on the front wheel 11, a wire harness formed by attaching connectors etc., to any of the composite cables 2A to 2F may be used on the front wheel 11 side.

What is claimed is:

1. A vehicle composite cable, comprising:
a pair of power wires for supplying a current to an electric parking brake unit that generates a braking force after stopping a vehicle, each of the power wires comprising a central conductor and an insulator covering the central conductor;
a first signal line comprising a first twisted pair wire for transmitting a first electrical signal during when the vehicle is in motion, the first twisted pair wire comprising a pair of first insulated wires twisted together, each of the first insulated wires comprising a central conductor and an insulator covering the central conductor;
a second signal line comprising a second twisted pair wire for transmitting a second electrical signal also during when the vehicle is in motion, the second twisted pair wire comprising a pair of second insulated wires twisted together, each of the second insulated wires comprising a central conductor and an insulator covering the central conductor; and
a sheath collectively covering the pair of power wires and the first and second signal lines,
wherein the pair of power wires and the first and second signal lines are not covered with a shield conductor, and the first signal line is separated from the second signal line by the pair of power wires, each having an outer diameter greater than each of the first insulated wires and each of the second insulated wires such that the first and second signal lines are separated by a distance at which crosstalk is suppressed,
wherein the first twisted pair wire and the second twisted pair wire are arranged on opposite side with respect to a line connecting respective centers of the pair of power wires.

2. The vehicle composite cable according to claim 1, wherein the first electrical signal comprises a wheel speed detection signal for detecting a rotation speed of a wheel, and
wherein the second electrical signal comprises a vehicle state quantity detection signal indicating a running state of the vehicle different from the rotation speed of the wheel.

3. The vehicle composite cable according to claim 1, wherein a region surrounded by the pair of power wires and the first and second signal lines form a space.

4. The vehicle composite cable according to claim 1, wherein an outer diameter of insulated wires paired and constituting the first signal line is equal to an outer diameter of insulated wires paired and constituting the second signal line.

5. The vehicle composite cable according to claim 1, wherein the first and second signal lines are respectively formed by twisting the pairs of insulated wires at the same twist pitch and different twist phases, and
wherein the pair of insulated wires constituting the second signal line are arranged along a direction orthogonal to an alignment direction of the pair of power wires when the pair of insulated wires constituting the first signal line are arranged along a direction parallel to the alignment direction of the pair of power wires, as viewed in a cross section orthogonal to a longitudinal direction of the sheath.

6. The vehicle composite cable according to claim 1, wherein the first and second signal lines are respectively formed by twisting the pairs of insulated wires at different twist pitches.

7. The vehicle composite cable according to claim 6, wherein one of the twist pitch of the first signal line and the twist pitch of the second signal line is not less than double the other.

8. A vehicle composite cable, comprising:
a pair of power wires for supplying a current to an electric parking brake unit that generates a braking force after stopping a vehicle;
a first signal line comprising a twisted pair wire transmitting a first electrical signal during when the vehicle is in motion;
a second signal line comprising a twisted pair wire for transmitting a second electrical signal also during when the vehicle is in motion; and
a sheath collectively covering the pair of power wires and the first and second signal lines,
wherein the first and second signal lines are not covered with a shield conductor, and the first signal line is separated from the second signal line by the pair of power wires, and wherein the sheath includes an artificial polypeptide fiber.

9. A vehicle composite cable, comprising: a pair of power wires for supplying a current to an electric parking brake unit that generates a braking force after stopping a vehicle; a first signal line comprising a twisted pair wire transmitting a first electrical signal during when the vehicle is in motion; a second signal line comprising a twisted pair wire for transmitting a second electrical signal also during when the vehicle is in motion; and a sheath collectively covering the pair of power wires and the first and second signal lines, wherein the first and second signal lines are not covered with a shield conductor, and the first signal line is separated from the second signal line by the pair of power wires with a filler, and, wherein the filler includes an artificial polypeptide fiber.

10. A vehicle composite cable, comprising: a pair of power wires for supplying a current to an electric parking brake unit that generates a braking force after stopping a vehicle; a first signal line comprising a twisted pair wire transmitting a first electrical signal during when the vehicle is in motion; a second signal line comprising a twisted pair wire for transmitting a second electrical signal also during when the vehicle is in motion; and a sheath collectively covering the pair of power wires and the first and second signal lines, wherein the first and second signal lines are not covered with a shield conductor, and the first signal line is separated from the second signal line by the pair of power wires, and, wherein the composite cable includes a braided shield, wherein strands constituting the braided shield are braided with an artificial polypeptide fiber.

11. The vehicle composite cable according to claim 1, wherein the pair of power wires and the first and second signal lines are held by the sheath via a lubricant.

12. A vehicle composite harness, comprising:
the vehicle composite cable according to claim 1, and
a connector attached to at least one of ends of the pair of power wires and the first and second signal lines that are exposed from the sheath.

* * * * *